Dec. 14, 1937.  M. ROTTER  2,102,167
GEAR DRIVE
Filed July 31, 1936
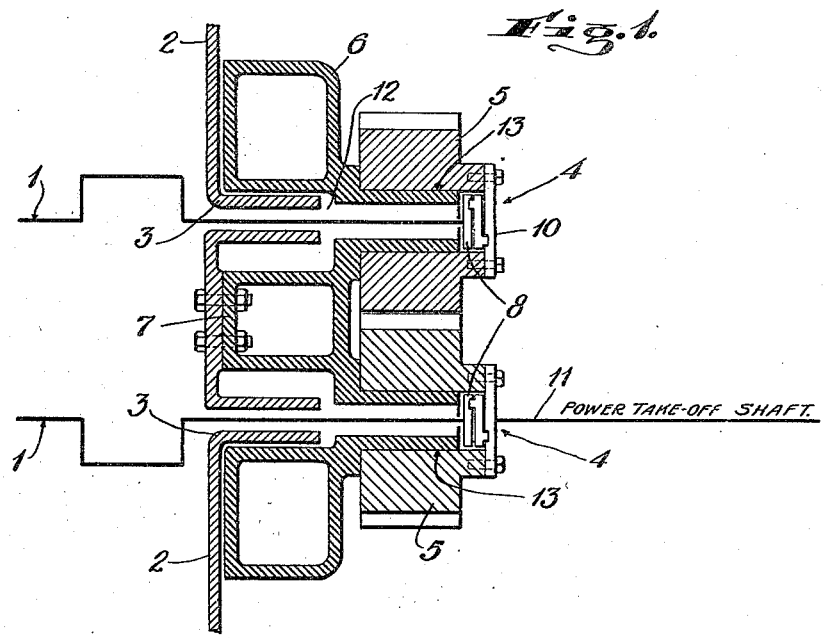
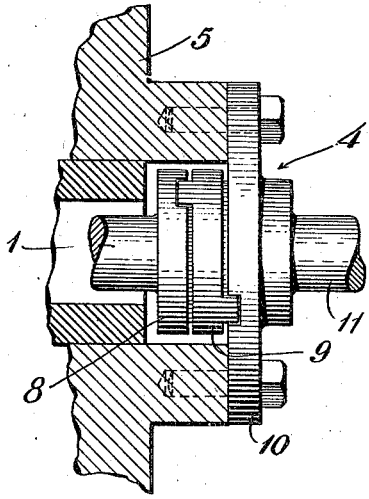
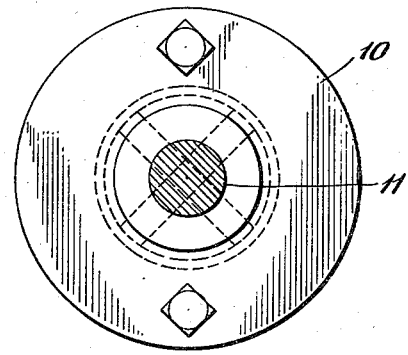
Max Rotter
INVENTOR
BY
ATTORNEYS Patented Dec. 14, 1937

2,102,167

UNITED STATES PATENT OFFICE 2,102,167

GEAR DRIVE

Max Rotter, Milwaukee, Wis., assignor to Busch-Sulzer Bros.-Diesel Engine Company, St. Louis, Mo., a corporation of Missouri Application July 31, 1936, Serial No. 93,537

4 Claims. (Cl. 74—411)

The invention has reference to gear-coupled crank-shafts and the like and more particularly to the coupling gearing whereby twin crank-shafts of combustion engines may be connected to each other and to a common power take-off although without limitation to any particular engine type. The object is to avoid, in a compact structure, the noise, wear and injurious effect resulting from thermal and kinetic distortions in such organizations and to maintain a substantially constant depth of mesh of the gear teeth of the coupling gear wheels under all conditions notwithstanding relative temperature differences or fluctuations and other causes.

The drawing which is wholly diagrammatic will suffice to illustrate the principles involved, Fig. 1 being in the plane of the shafts and Figs. 2 and 3 details of the coupling.

The two engine crank-shafts 1 may be understood to be the crank-shafts of a twin-cylinder or opposed-piston engine or other type, both journalled in the engine frame 2, in bearings 3. The shafts are extended through and beyond the bearings into connection with Oldham-type couplings 4 through which they respectively drive the toothed gear wheels 5. These gear wheels are geared to each other, either directly, with the teeth of one intermeshing with those of the other, or otherwise and as usual in opposed-piston engines.

While the crank-shafts are journalled in the main frame 2 these gear wheels are journalled in a supplemental and independent frame or gear support 6 and the two frames are rigidly fixed to each other by the bolts 7 or otherwise at their central regions, that is to say, at a point which is symmetrical with respect both to the shafts and the wheels.

The detail of the construction just referred to is not of consequence. An Oldham coupling, which is well known, comprises a terminal plate or flange 8, in the present case fitted to or formed on each crank shaft 1 (Fig. 2), a floating disc 9 and a complementary plate or flange 10 secured to the hub of the connected gear wheel. The floating disc 9 is formed with radial ribs on its opposite sides, rectangularly related, and registering with corresponding grooves in the proximate end plates 8 and 10. It is also to be understood as having take-up springs, to prevent chattering, and other incidental coupling appurtenances not shown because well known. One of the gear wheels or one of the plates 10 is attached to the end of a power take-off shaft 11 for driving purposes. The supplemental frame 6 is chambered at 12 to accommodate with some clearance any projecting parts of the frame bearings 3 and its other chambers may accommodate water circulation if desired. When bolted in place its tubular bosses 13, which form the bearings for the gear wheels 5 are practically in line with the axes of the crank shafts.

The distortion effects which have heretofore obstructed the most efficient action of apparatus of this class are represented by the bending of the crank-shafts under the piston impulses, the lateral displacement of their axes incident to the running clearances which they have in their respective frame bearings 3; the change of the distance between such bearings which results from thermal expansion of the engine frame, ordinarily considerably hotter than the gear support, and the unequal change, from thermal effects, of the radii of the gear wheels themselves. While the departures are individually not large, in the aggregate and at times, they are found to produce a considerable and very objectionable variation in the depth of meshing of the gear teeth by which the twin shafts are connected, an objection always aggravated by the use of aluminum alloys for the engine frame which alloys have high expansion coefficients. By this invention and as exemplified in the construction above described, these departures are rendered ineffectual on the mechanical performance for the following reasons:

The symmetrical attachment of the main frame 2 and supplemental frame 6 permits the latter to expand away from its point of bolt attachment, independently of the expansion of the engine frame, so that the one frame does not affect the other although the supplemental frame is carried on the main frame. The gear wheels 5 are made of the same metal, or of metal having the same expansion coefficient, as that of the supplemental frame on which they are journalled and in consequence, such expansion, or contraction, as may occur in this frame with reference to its central bolting point 7, is compensated or neutralized by the corresponding expansion or contraction, in the opposite direction, of the gear wheel radii with respect to their journal bearings 13, which keeps the gear teeth meshing to the same and proper depth least productive of wear, while any displacement of the crank-shafts, due to flexure or engine frame expansion is ineffective to modify that condition or affect the bearing load by reason of the intervention between them and the wheels, of the laterally flexible but torsionally rigid couplings 4. In consequence of this combination and arrangement the geared drive is smooth and quiet and also uniformly efficient under all conditions of use, and engines embodying this principle of construction give better performance and are generally more satisfactory.

I claim:

1. In a gear drive, the combination of twin shafts journalled in a common frame, a toothed gear wheel aligned with and flexibly connected to each of said shafts, a supplemental frame on which said wheels are journalled, said frame being secured to the main frame at a point intermediate of said shafts and wheels, and each being free to expand independently of the other in opposite directions from said point and said wheels having an expansion coefficient corresponding to that of the supplemental frame adapted to neutralize the effect of its expansion.

2. In a gear drive, the combination of twin shafts journalled in a main frame, a supplemental frame secured by its mid-point to a point on said main frame intermediate of said shafts, tubular bearing bosses on said supplemental frame surrounding said shafts, gear wheels on said bosses, flexible couplings between said shafts and said gear wheels, and a power take-off from one of said wheels.

3. In a gear drive, the combination of twin engine crank-shafts journalled in bearings on an engine frame and extended beyond said bearings, gear wheels to which said shafts are connected, a supplemental frame secured to said engine frame at a point between said crank-shaft bearings and carrying journal bearings for said gear wheels, said frames being rigidly affixed to each other at a point symmetrically related to said shafts and to said wheels, a laterally flexible coupling between each shaft and its gear and a power take-off from one of said gear wheels.

4. In a gear drive, the combination of twin engine crank shafts journalled in bearings in a common engine frame and extended beyond said bearings, a supplemental frame secured to said engine frame at a point intermediate of said shaft bearings and having tubular bosses respectively surrounding the extended parts of said shafts, intermeshing gear wheels on said bosses having an expansion coefficient corresponding to the coefficient of said supplemental frame and flexible couplings between said shafts and their associated gear wheels.

MAX ROTTER.